United States Patent
Wigren

(10) Patent No.: US 9,374,179 B2
(45) Date of Patent: Jun. 21, 2016

(54) SUPERVISION OF FAULTS IN A RECEIVER CHAIN BASED ON NOISE FLOOR MONITORING

(75) Inventor: Torbjorn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 697 days.

(21) Appl. No.: 12/674,194

(22) PCT Filed: Aug. 20, 2007

(86) PCT No.: PCT/SE2007/050561
§ 371 (c)(1),
(2), (4) Date: Feb. 19, 2010

(87) PCT Pub. No.: WO2009/025595
PCT Pub. Date: Feb. 26, 2009

(65) Prior Publication Data
US 2010/0214931 A1    Aug. 26, 2010

(51) Int. Cl.
*G01R 31/08* (2006.01)
*H04B 17/345* (2015.01)
*H04B 17/327* (2015.01)
*H04W 24/00* (2009.01)

(52) U.S. Cl.
CPC ............ *H04B 17/345* (2015.01); *H04B 17/327* (2015.01); *H04W 24/00* (2013.01)

(58) Field of Classification Search
USPC .......... 370/216, 241, 242–245, 252; 714/724, 714/726, 727, 732, 733, 738; 455/67.3
See application file for complete search history.

(56) References Cited

U.S. PATENT DOCUMENTS

| | | | |
|---|---|---|---|
| 4,479,252 A | 10/1984 | Souchay et al. | |
| 6,501,735 B1 * | 12/2002 | Han | 370/242 |
| 6,671,512 B2 | 12/2003 | Laakso | |
| 6,798,843 B1 | 9/2004 | Wright et al. | |
| 7,738,412 B2 | 6/2010 | Hamalainen | |
| 2001/0055952 A1 * | 12/2001 | Ficarra | 455/67.3 |

(Continued)

FOREIGN PATENT DOCUMENTS

| | | |
|---|---|---|
| CA | 2552732 A1 | 7/2005 |
| EP | 1337050 A2 | 8/2003 |

(Continued)

OTHER PUBLICATIONS

Wigren, T. et al. "Estimation of Uplink WCDMA Load in a Single RBS." 2007 IEEE 66th Vehicular Technology Conference (VTC-2007 Fall), Sep. 30-Oct. 3, 2007, pp. 1499-1503.

(Continued)

*Primary Examiner* — Yemane Mesfin
*Assistant Examiner* — Mon Cheri Davenport
(74) *Attorney, Agent, or Firm* — Coats & Bennett, PLLC

(57) ABSTRACT

A method for supervision of faults in a receiving signal chain of a wireless communication comprises providing (210) of data representing measured received powers in the receiving signal chain at a number of time instances. The method further comprises determining of (220) a noise floor value at a number of time instances based on the data representing measured received powers. A time evolution of the determined noise floor values is registered (230) and any occurrence of a fault in the receiving signal chain is detected (240) based on the registered time evolution. An arrangement for performing supervision of faults in a receiving signal chain is also presented.

29 Claims, 6 Drawing Sheets

(56) References Cited

U.S. PATENT DOCUMENTS

| | | |
|---|---|---|
| 2002/0115459 A1 | 8/2002 | Chuang et al. |
| 2005/0031059 A1 | 2/2005 | Moore et al. |
| 2005/0129152 A1 | 6/2005 | Hillstrom |
| 2005/0286627 A1* | 12/2005 | Tabatabaei ............ 375/238 |
| 2007/0135056 A1 | 6/2007 | Kremer et al. |
| 2008/0102757 A1 | 5/2008 | Kim |
| 2009/0262658 A1 | 10/2009 | Kondo |
| 2011/0021239 A1 | 1/2011 | Wakabayashi |

FOREIGN PATENT DOCUMENTS

| | | |
|---|---|---|
| EP | 1727388 A2 | 11/2006 |
| RU | 2153224 | 7/2000 |
| WO | 2005088864 A1 | 9/2005 |
| WO | 2006/076969 A1 | 7/2006 |
| WO | 2006118498 A1 | 11/2006 |
| WO | 2007/024166 A1 | 3/2007 |
| WO | 2007055626 A1 | 5/2007 |

OTHER PUBLICATIONS

Lundin, E. G. et al. "Uplink Load Estimates in WCDMA with Different Availability of Measurements." 57th IEEE Vehicular Technology Conference (VTC 2003-Spring), Apr. 22-25, 2003, vol. 2, pp. 1198-1202.

* cited by examiner

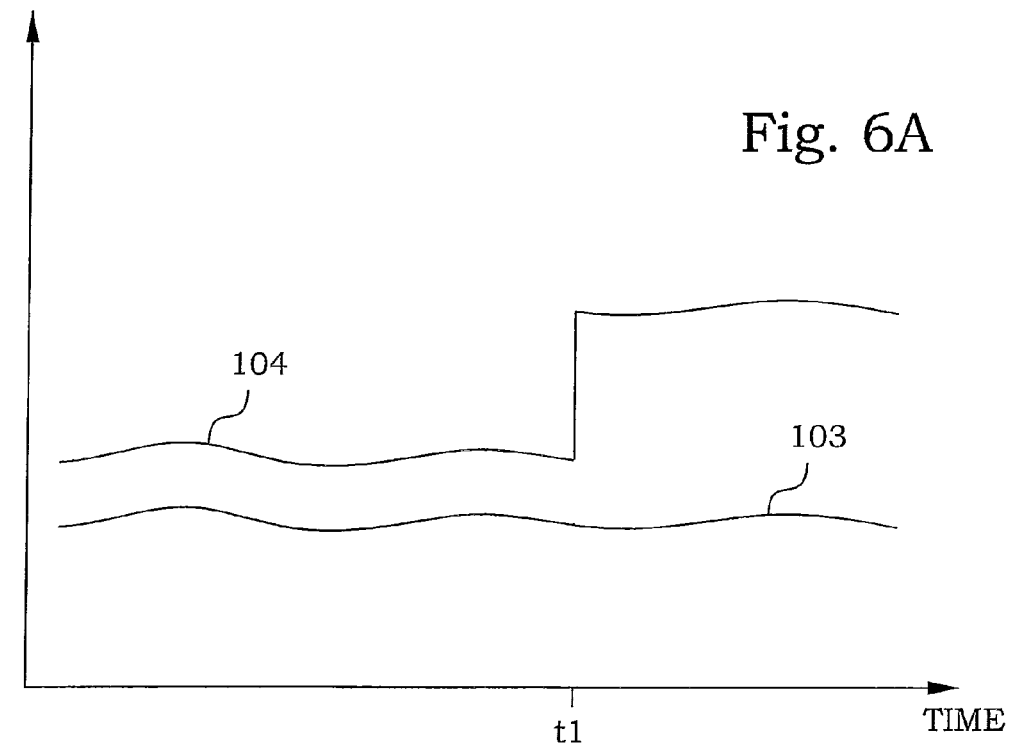
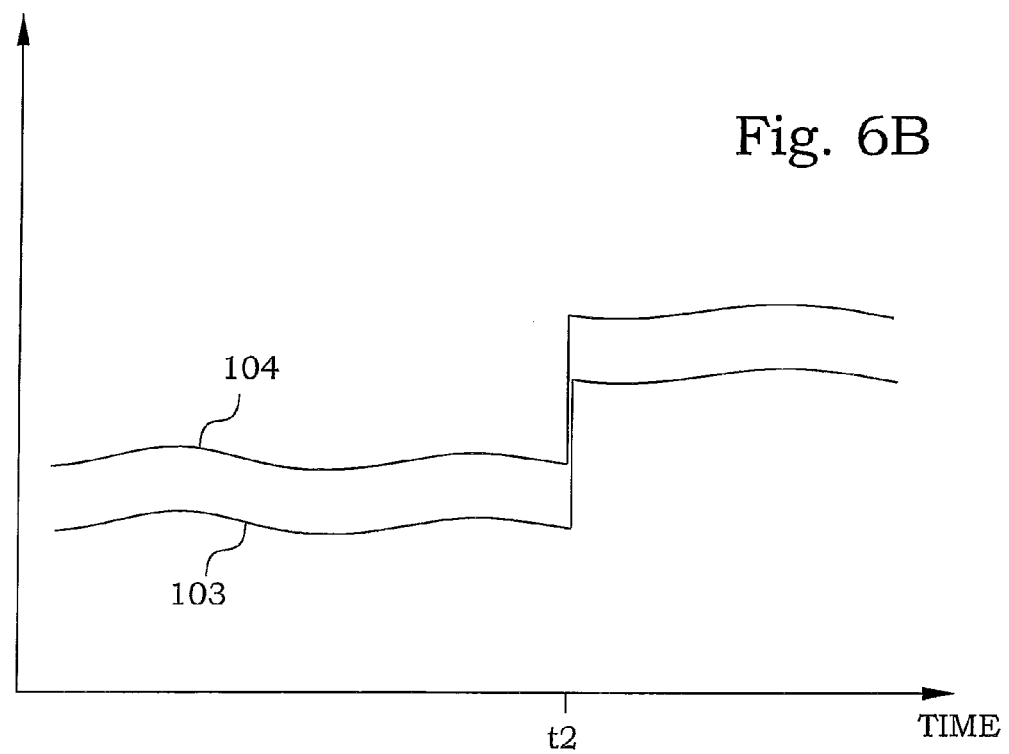

SUPERVISION OF FAULTS IN A RECEIVER CHAIN BASED ON NOISE FLOOR MONITORING

CROSS-REFERENCE TO RELATED APPLICATIONS

This application is the National Stage of International App. No. PCT/SE2007/050561, filed Aug. 20, 2007, entitled "SUPERVISION OF FAULTS IN A RECEIVER CHAIN BASED ON NOISE FLOOR MONITORING," which is hereby incorporated by reference as if fully set forth herein.

TECHNICAL FIELD

The present invention relates in general to methods and devices for supervision and fault detection in wireless communication systems and in particular in receiving signal chains in the wireless communication systems.

BACKGROUND

Faults appear occasionally, also in the most high-quality communication systems. Many types of faults do mainly affect only the node in which it is situated. However, faults occurring in the receiving signal chain may influence quality or capacity also in other parts of the communication system. A fault in the reception of a signal may in many situations be interpreted just as a signal having poor radio conditions. Means for regulating powers and interference levels are available in many systems today, and such a fault may thus result in increased use of power, higher interference levels and eventually lower useful transmission resources.

In some systems of today, equipment is tested for faults by separate testing routines. However, such testing events also reduce the total available transmission resources. Large faults can be detected by sudden interruptions in the normal traffic. However, smaller faults or non-optimum operation of different parts are more difficult to find. Also, when a fault is known to be present in a receiving signal chain, it typically takes some efforts to localize where in the chain the fault appears.

A general problem in prior art wireless communication systems is thus that supervision and fault detection often is insufficient.

SUMMARY

An object of the present invention is thus to provide improved methods and arrangements for fault detection in receiving signal chains, i.e. from a receiver front end out to the antenna. A further object of the present invention is to provide methods and arrangements which are operable concurrently with the normal operation of the communication system. Yet a further object is to provide methods and arrangements that do not detrimentally influence traffic quality or transmission capacity.

The above objects are achieved by methods, arrangements, nodes and systems according to the enclosed patent claims. In general words, in a first aspect, a method for supervision of faults in a receiving signal chain of a wireless communication comprises providing of data representing measured received powers in the receiving signal chain at a number of time instances. The method further comprises determining of a noise floor value at a number of time instances based on the data representing measured received powers. A time evolution of the determined noise floor values is registered and any occurrence of a fault in the receiving signal chain is detected based on the registered time evolution.

In a second aspect, an arrangement for supervision of faults in a receiving signal chain of a wireless communication comprises means for providing data representing measured received power in the receiving signal chain at a number of time instances and a processor arrangement. The processor arrangement is arranged for determining a noise floor value at a number of time instances based on the data representing measured received power. The processor arrangement is further arranged for evaluating a time evolution of the determine noise floor values and for detecting any occurrence of a fault in the receiving signal chain based on the time evolution.

In a third aspect, a node for use in a wireless communication system comprises an arrangement according to the second aspect.

In a fourth aspect, a wireless communication system comprises at least one node according to the third aspect.

One advantage with the present invention is that continuous supervision and fault detection can be performed simultaneously to normal operation, and where measurements that in many cases already are available can be utilized for analyzing any appearances of faults. This makes it possible to keep any implementation costs at a low level.

BRIEF DESCRIPTION OF THE DRAWINGS

The invention, together with further objects and advantages thereof, may best be understood by making reference to the following description taken together with the accompanying drawings, in which:

FIGS. 6A-B are diagrams illustrating time evolution of a noise floor measure determined at different points in a receiver chain;

DETAILED DESCRIPTION

Figure 1:
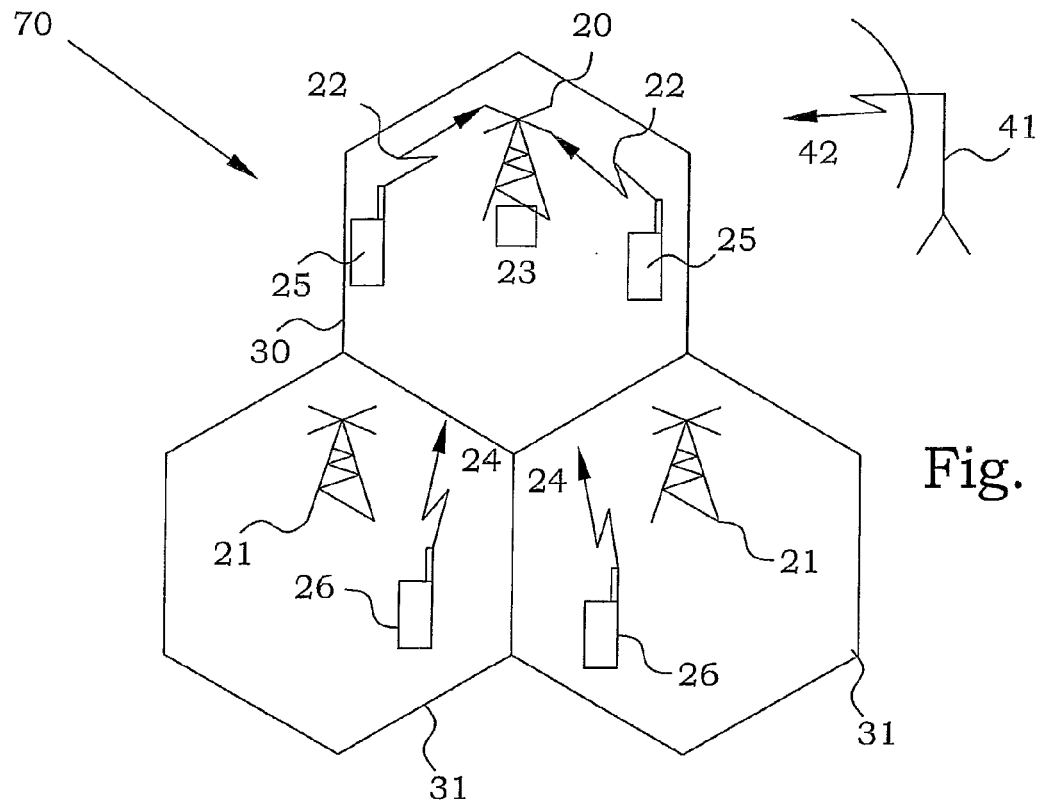
FIG. 1 is a schematic drawing of signal powers in a cellular communication system.

Throughout the entire disclosure, bold letters in equations refer to vector or matrix quantities.

In the drawings, the same reference numbers are used for similar or corresponding parts.

In the present invention a noise floor value is utilized for fault detection purposes. The noise floor is typically determined in different systems for many other reasons, and the present description will start with a short review of where to find some examples of such use.

A specific technical challenge in e.g. WCDMA and similar systems is the scheduling of enhanced uplink channels to time intervals where the interference conditions are favourable, and where there exist a sufficient capacity in the uplink of the cell in question to support enhanced uplink traffic. It is well known that existing users of the cell all contribute to the interference level in the uplink of WCDMA systems, as well as contributions from terminals in neighbour cells. The load of the cell is directly related to the interference level of the same cell.

In order to retain stability of a cell fast enhanced uplink scheduling algorithms operate to maintain the load below a certain level. The reason is that the majority of uplink user channels are subject to power control. A momentary increase of the traffic increases the interference and the power control increases the powers in order to keep the received power level of each channel at a certain signal to interference ratio. If the load level is too high, this may lead to an uncontrolled instability, a so called power rush.

The load of a cell in e.g. a CDMA system is usually referred to some quantity related to power. Power quantities, such as total power level and noise floor (ideally thermal noise), typically have to be determined.

Another important feature that also requires load estimation for its control is the coverage of the cell. The coverage is normally related to a specific service that needs to operate at a specific SIR to function normally. The uplink cell boundary is then defined by a terminal that operates at maximum output power. In order to maintain the cell coverage it is necessary to keep the interference below a specific level. This means that load estimation is important also for coverage. In particular load estimation is important from a coverage point of view in the fast scheduling of enhanced uplink traffic in the RBS. Furthermore, the admission control and congestion control functionality in the radio network controller (RNC) that controls a number of RBS's also benefits from accurate information on the momentary noise rise of the cell, which in turn depends on the noise floor measure.

Different useful approaches for estimation of noise floor values are given further below.

In the present invention it is realized that time aspects of a noise floor value, i.e. how the noise floor value changes with time, can be utilized for supervision and fault detection. Contributions to powers that are measured in a receiver have different sources. FIG. 1 illustrates a typical wireless communication system 70. Within a cell 30, a number of mobile terminals 25 are present, which communicate with a base station 20 over different links 22, each contributing to a total received power in the base station 20. The cell 30 has typically a number of neighbouring cells 31 within the same wireless communication system 70, each associated with a neighbour base station 21. The links 24 of the neighbouring cells 31 also contribute with radio frequency power detected in the base station 20. There may also be other network external sources 41 of radiation. Finally, a term 23 arises also from the receiver itself, and this term is typically denoted as the noise floor.

In a mathematical approach, a total wide band power measurement $P_{measurement}^{RTWP}(t)$ can thereby be expressed by:

$$P_{Measurement}^{RTWP}(t) = \sum_{i=1}^{n} P_i^{Code}(t) + P^{E+N}(t) + P_N(t) + e^{RTWP}(t), \quad (1)$$

where $P_i^{Code}(t)$ is the signal power of code number i, $P_N(t)$ is the noise floor and $P^{E+N}(t)$ is the power contributions from neighbouring cells and external sources, i.e.:

$$P^{E+N} = P^E + P^N, \quad (2)$$

where $P^E$ is the contribution from external sources and $P^N$ is the contribution from neighbouring cells. $e^{RTWP}(t)$ models measurement noise.

It can be mathematically proved that a linear estimation of $P^{E+N}(t)$ and $P_N$, is not an observable problem. Only the sum $P^{E+N}+P_N$ is observable from the available measurements.

The noise floor basically arises due to thermal noise in the receiving signal chain. An erroneous function of any of the components in such a receiving signal chain will typically give rise to a higher noise level than normally, at any point after the erroneous component. From a single value of the noise floor it is very difficult to determine if any fault is present. However, by monitoring or registering a time evolution of the noise floor or a best estimate of a noise floor, information about changes in the noise level can be achieved. Some changes may be explained by normal occurring factors, such as inaccuracies in estimation principles or natural changes in temperature. However, other changes can be used as detections of a likely occurrence of a fault.

Figure 2:
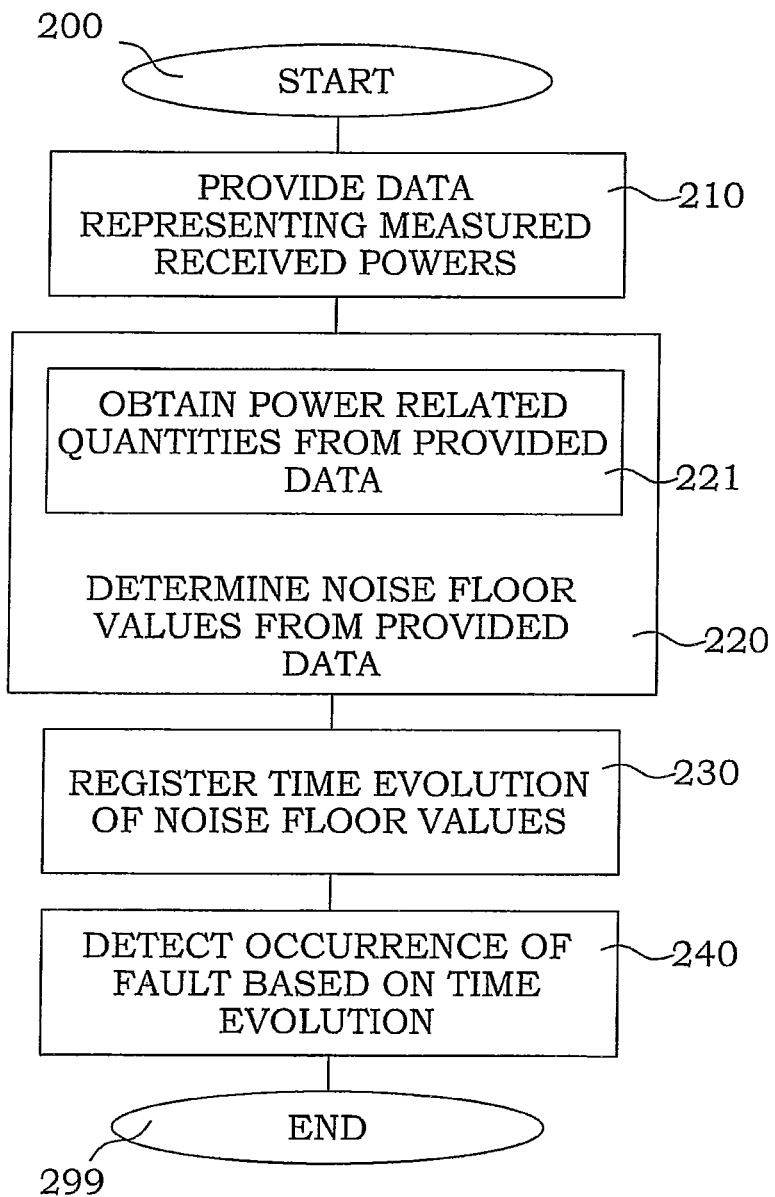
FIG. 2 is a flow diagram of steps of an embodiment of a method according to the present invention.

FIG. 2 illustrates a flow diagram of an embodiment of a method according to the present invention. The method for supervision of faults in a receiving signal chain of a wireless communication starts in step 200. In step 210, data representing measured received powers in the receiver signal chain is provided at a number of time instances. A noise floor value is determined in step 220 at a number of time instances based on the data representing measured received powers. In a preferred embodiment, the determining step 220 comprises a step 221 of obtaining power related quantities at a number of instances based on the data representing measured received powers whereby the determination of the noise floor is based on these power related quantities. In step 230, a time evolution of the determine noise floor values is registered. Any occurrence of a fault in the receiving signal chain is detected in step 240, based on the registered time evolution. In a preferred embodiment, the step of detecting comprises comparing of the registered time evolution with a model time evolution and indicating a fault if a measure representing a difference between the registered time evolution and the model time evolution exceeds a threshold value. The model time evolution may be fully or partly based on a statistical treatment of previous registered time evolutions for similar conditions. The model time evolution may also be fully or partly based on theoretical models of expected time evolutions for similar conditions.

Figure 3:
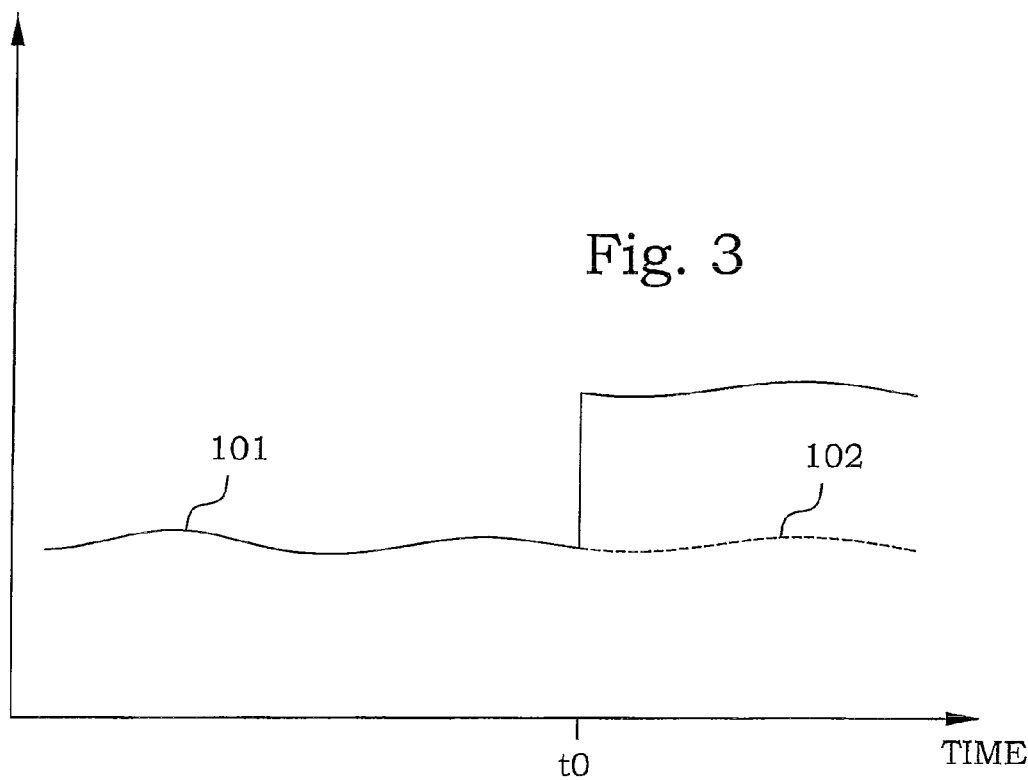
FIG. 3 is a diagram illustrating a time evolution of a noise floor measure.

A tentative situation is illustrated in FIG. 3. The time evolution 101 of a noise floor value is here illustrated in a diagram. In the beginning the noise floor value follows a relatively slow-varying, typically periodic, variation. Such variations may be dependent on inaccuracies in noise floor estimation routines or may be a result of a natural temperature variation. However, at time t0, a drastic deviation from normal behaviour is seen. Such changes can not be explained by natural causes in a well operating system and are therefore likely to indicate that a fault has appeared. A model time evolution is indicated by a curve 102. As mentioned above, the model time evolution could be based on statistical treatment of earlier noise floor values and/or on theoretical considerations. By defining a difference measure between the registered time evolution of the noise floor values and the model time evolution, a measure can be obtained reflecting a deviation from normal. If such a difference exceeds a certain threshold, the deviation can be considered as likely being caused by an introduction of a fault.

There are numerous methods in prior art for finding difference measures between two series of data, e.g. time evolutions. The provision and analysis of the difference as such is therefore known from prior art. The actual preferred methods selected in the present invention depend on the application and the type of difference measures used. The details of these steps are, however, not of particular importance for achieving the basic advantages of the application of the main inventive ideas and are therefore omitted from the present description. Anyone skilled in the art has the knowledge to find suitable methods in any basic standard detection theory literature for implementing this part invention.

As mentioned above, noise floor values are already today requested for different purposes in wireless communication systems. Almost any prior art method for providing such measure, based on measurements of received powers, can be utilized for the purposes described in the present invention.

One approach to provide noise floor values used to improve load estimation is disclosed in the published international patent application WO 2006/076969. A minimum value of a power related quantity, preferably a difference between data representing at least two different types of received powers, is used as an estimate of an upper limit of the thermal noise floor. In a further preferred embodiment, the difference is a difference between the instantaneous received total wideband power and the instantaneous sum of powers of all links used in the same cell. In absence of any more information, such an upper limit can be used as an estimate of the noise floor itself. In a preferred embodiment, the minimum value is determined within a certain time period, thereby giving a presently best estimation of the noise floor. The noise floor values obtained in this manner may advantageously also be utilized along the principles of the present invention.

An optimal and soft algorithm for noise rise estimation based on a similar basic idea of minimum values is disclosed in the published international patent application WO 2007/024166. Here, an estimation technique based on Kalman filtering is disclosed, resulting in information about a noise floor as an intermediate result. In such an approach the obtaining step comprises estimation of probability distributions for a power quantity based on the provided received powers. The determination of a noise floor value useful in the present invention then comprises computation of a conditional probability distribution of a noise floor measure based on at least a number of the estimated probability distributions for said power quantity. From this conditional probability distribution of a noise floor measure, a noise floor value is easily obtainable.

Figure 4:
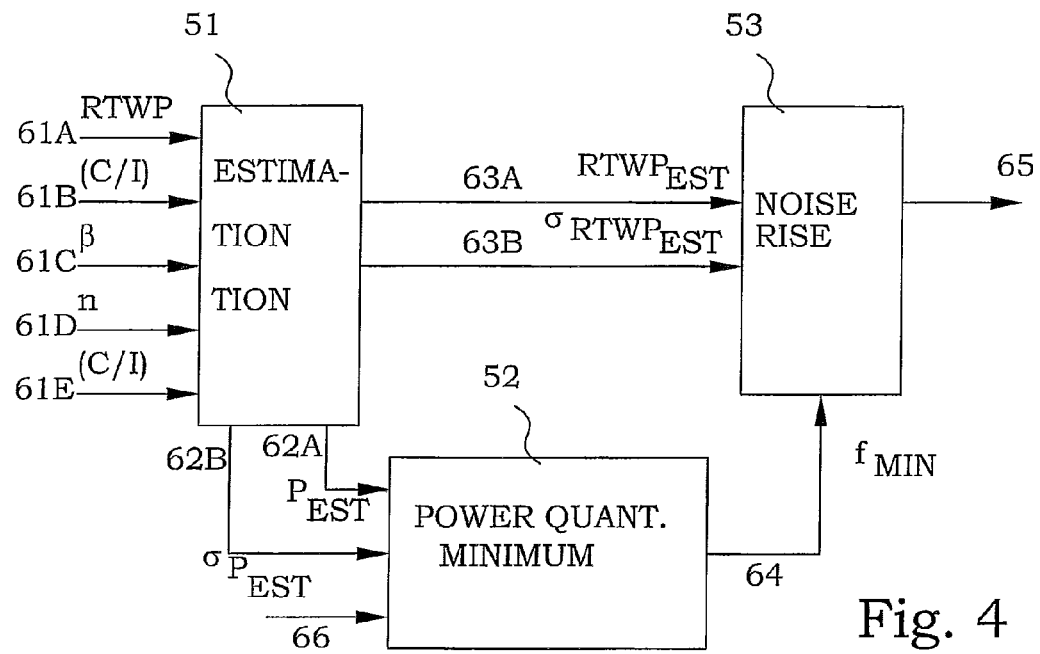
FIG. 4 is a block diagram of an embodiment of an arrangement for determining of noise floor values.

With reference to FIG. 4, an embodiment of determining a noise floor is based on soft estimation. In the most advanced form, the possible noise rise estimation is performed in three main blocks 51, 52, 53.

The first block 51, i.e. the power estimation block, applies an estimation algorithm for estimation of certain power quantities that are needed by subsequent processing blocks. In the present embodiment, the estimation is a so-called extended Kalman filter. Specifically, the block 51 receives a number of inputs 61A-E in the present embodiment comprising the measured received total wideband power (RTWP) 61A, measured code power to interference ratio (C/I) of channel i 61B, beta factors for channel i 61C, number of codes for channel i 61D, corresponding to code power to interference ratio commanded by a fast power control loop 61E, and provides outputs comprising power estimates 62A, 63A and corresponding standard deviations 62B, 63B. The output 62A is an estimate of a power quantity being the sum of neighbour cell WCDMA interference power, in-band non-WCDMA interference power and thermal noise floor power, and the output 63A is the estimated received total wideband power (RTWP) and the output 63B is the corresponding variance. Together with the estimated mean values of the power quantities, the variances of the power quantities define estimated probability distribution functions (PDF's) of the power quantities. When the outputs are from an extended Kalman filter arrangement, these parameters are the only ones needed to define the estimated (approximate) Gaussian distributions that are produced by the filter. Thus, enough information is given to define the entire probability distribution information of the power estimates.

A second block 52 applies in the present embodiment Bayesian estimation techniques in order to compute a conditional probability density function of an extreme value 64 of one of the above mentioned power quantities. The estimation is based on a number of estimated probability distributions from the first block 51. Parameters 66 giving information about a prior expected probability distribution of the noise floor power is in the present embodiment provided to the conditional probability distribution estimation block 52, in order to achieve an optimal estimation. From this conditional probability density function of an extreme value 64, a noise floor value can be determined.

In this particular embodiment, a third block 53 performs noise rise estimation, which however is outside the main scope of the present invention. In the present embodiment, this is performed by a calculation of the conditional probability distribution of the quotient of the momentary estimated RTWP distribution 63A, 63B from block 51, and the conditional probability distribution of the noise power floor 64. The noise rise estimate 65 is preferably computed as a conditional mean of the conditional probability distribution of the quotient.

For larger systems and more exact models, computation complexity easily becomes large. Complexity reduction procedures concerning such algorithms are further disclosed in the published international patent application WO 2007/055626, and are advantageously also applied in the field of the present invention.

When considering the provision of data, there are two basic embodiments. In a first embodiment, the method includes the measuring itself of received power in the receiving signal chain. The time instances of the measurements are thereby easily controllable and integrated in the remaining method. In another embodiment, a separate method is responsible for the actual measuring, and the provision of data according to the present invention will in such case simply comprise the reception of data representing measured received power in the receiving signal chain. Information about measuring time instants is preferably attached to the data, to be used during the subsequent computational steps.

Figure 5:
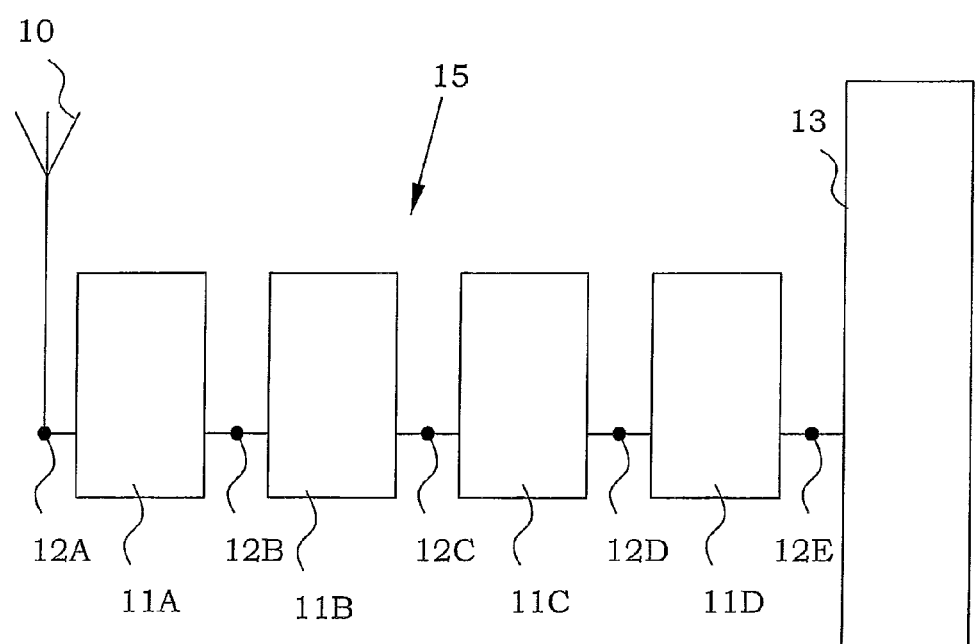
FIG. 5 is a schematic drawing of a receiver chain in a wireless communication system.

In a receiving signal chain, a fault can be determined according to the above principles in any component from the antenna to the point at which the power is measured. In FIG. 5, a schematic receiving signal chain 15 is illustrated. An antenna 10 is connected to a network 13 via a series of signal handling units 11A-D. Received signal power can in principles be determined at different stages 12A-E during the signal handling in the receiving signal chain 15. If powers are measured or otherwise determined at e.g. stage 12C, faults occurring in the antenna 10 or the signal handling units 11A and 11B can be detected by the principles described above. However, faults in signal handling units 11C and 11D cannot be detected. If powers instead are measured at stage 12E, faults in all signal handling units 11A-D may be detected. However, in such a case, it may instead be cumbersome to distinguish where in the receiving signal chain 15 the error occurred.

If instead powers are measured at more than one stage, i.e. at at least two positions in a receiving signal chain 15, more information can be provided. If independent power measurements are performed at e.g. stage 12B and 12E, a fault can be detected anywhere in the receiving signal chain 15. Furthermore, it is likely also to be able to localize the fault to be present before or after stage 12B.

This is further illustrated in the diagram of FIGS. 6A and 6B. The time evolution of noise floor values based on measurements at stage 12B and 12E of FIG. 5 are illustrated as curves 103 and 104, respectively, in FIG. 6A. The differences in noise floor are typically associated with additional noise arising in the signal handling units 11B-D. In FIG. 6A, at time t1, the curve 104 associated with measurements made at stage 12E presents a strange behaviour. However, the curve 103 associated with measurements made at stage 12B follows a more normal path. By comparing the curves, it can be concluded that a fault is likely to have appeared in the receiving signal chain 15 between the measurement positions, e.g. in any of the signal handling units 11B-D. Analogously, time evolution for another situation of noise floor values based on measurements at stage 12B and 12E of FIG. 5, are illustrated as curves 105 and 106, respectively, in FIG. 6B. Here both curves present unexpected behaviours at time t2. The unexpected behaviour indicates that a fault is present. Since both curves are suffering from these changes, it can be concluded that a fault is likely to have appeared in the receiving signal chain 15 before the first measurement position, i.e. in the antenna or the signal handling unit 11A.

If time evolutions of noise floor values are available from more than one point in the receiving signal chain, they can first of all be utilized as redundancy for the fault detection. Furthermore, they can, as described above, be utilized as mutual model time evolutions, which enable some kind of spatial determinations of faults. In other words, data representing measured received powers at least two positions in a receiving signal chain is provided. The determining of a noise floor then comprises determining of separate noise floor values for the at least two positions. The detection can thereby be based on a comparison between the registered time evolutions of the determined noise floor values of the at least two positions.

Noise floor determination at several positions is particularly advantageous in systems presenting receiver diversity. MIMO radio techniques utilise receiver diversity. MIMO radio techniques divide/mix incoming bit streams into one separate stream for each transmitting branch. These branches are preferably designed so that the transmitted multiple bit streams are as uncorrelated as possible at the receiving receiver branches. This can e.g. be accomplished with the use of different polarization and/or by using transmitting branches that are located at different enough locations (spatial diversity). The advantage of the MIMO concept is that if the correlation between bit streams is sufficiently low at the receiving end, the capacity can be increased by a factor equal to the number of transmitting branches. This is due to the fact that each transmitting branch can be viewed as a separate channel, exploiting the complete spectral bandwidth of the allocated channel. The technical challenge is to make sure that the transmitted bit streams remain uncorrelated at the receiving end, at the same time as the physical size of the antenna is kept small enough. This can be very tricky in a small handheld terminal, although polarization diversity appears to be promising in such applications.

In an embodiment of the present invention, where the wireless communication system is provided with receiver diversity and the receiving signal chain therefore comprises at least two receiver branches, the method of fault detection preferably comprises a determination of separate noise floor values for the at least two receiver branches. In embodiments utilizing intermediate power related quantities, the power related quantities are related to received powers at the at least two receiver branches. This means that the detection can be based on a comparison between the time evolutions of the determined noise floor values of the at least two receiver branches. An initial difference can be treated as a calibration between the receiver branches, whereas following differences between the branches are indications of differences in operation, e.g. an occurrence of a fault.

In order to fully exploit the MIMO concept, a large number of dedicated radio algorithms have been developed. Now, an important pre-requisite for the use of MIMO processing schemes is a model of the involved channels. Typically, these channel models need to be created individually for each MIMO branch. The reason for this is that component variations result in scale factor variations (for the power) between the receiver branches of more than a dB. An alternative would be to calibrate the receiver branches and compute channel models by processing of all measurements simultaneously. It can be expected that such a procedure would be more efficient, e.g. since more prior information is available, i.e. the receiver branches are calibrated. Such calibration is however costly.

When estimation algorithms are used together with receiver diversity systems, mutual influences between the different receiver branches can instead be modelled and included in the algorithm. This generally increases the reliability of the estimation. In one such embodiment, data of measures of received total wideband power for at least a first receiver branch and a second receiver branch at a plurality of times is provided. The determination of noise floor values comprises estimating, a plurality of times, a probability distribution for a first power quantity and a second power quantity, both being related to selected state variables of an estimation algorithm, from quantities representing the measured received total wideband power of the first receiver branch as well as of the second receiver branch using selected measurement functions of the selected state variables of the estimation algorithm. The selected state variables correspond to cell power quantities. and the selected measurement functions correspond to the quantities representing the measured received total wideband power of the first and second receiver branches. The determination further comprises a computation of a conditional probability distribution of a first noise floor measure based on at least a number of the estimated probability distributions for the first power quantity, and a conditional probability distribution of a second noise floor measure based on at least a number of the estimated probability distributions for the second power quantity. The provision of the noise floor value is then based on the computed conditional probability distributions of the first and second noise floor measures.

The load estimation techniques of WO 2007/024166 are possible to apply also in cases of receiver diversity and MIMO. According to a present embodiment, the load estimation is not performed separately per branch, but instead in a common processing of power quantities of all branches, however, still providing noise floor estimates for the individual branches. In receiver diversity applications and MIMO, the receiver branches are ideally uncorrelated to each other. In reality, however, a certain degree of correlation remains. By use of the present embodiment, this correlation can be exploited for enhancement of the estimation of the noise floor. More particularly, the correlation enhances the estimation of the so called residual power by using a more general filter structure than used before. The correlation is then modelled by the introduction of correlation in the joint systems noise covariance matrix.

Figure 7:
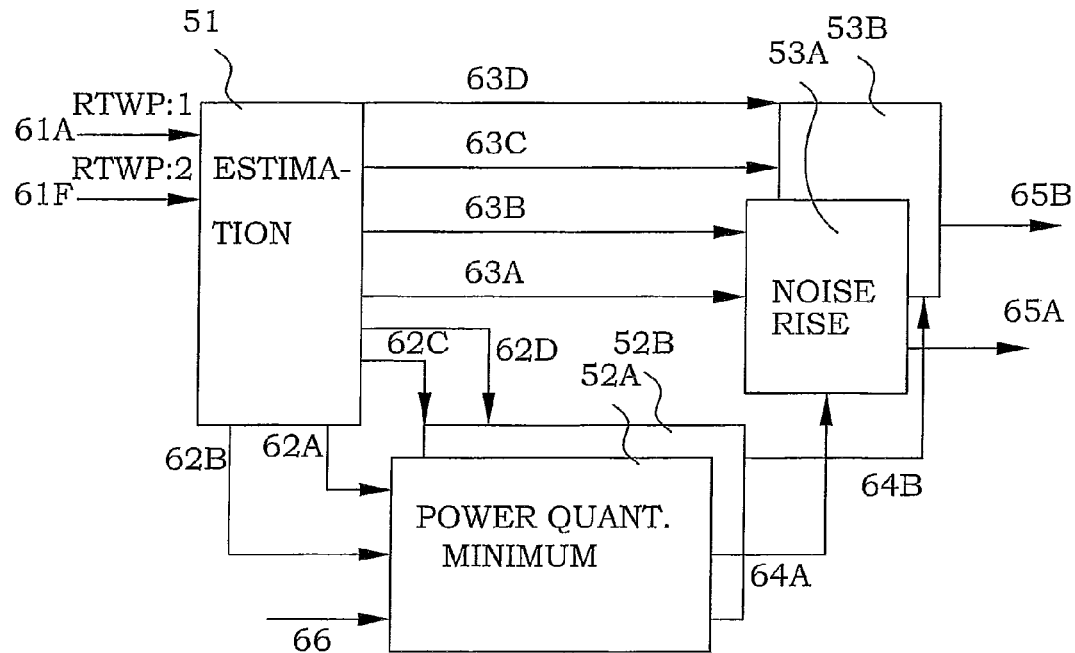
FIG. 7 is a block diagram of an embodiment of an arrangement for determining of noise floor values in a communication system having receiver diversity.

FIG. 7 illustrates one embodiment of a soft estimation of the thermal noise power floor according to the present invention. In this particular embodiment, the noise floor measure is also used for load estimation purposes. In this embodiment, two receiver branches are present. Specifically, the block 51 receives inputs 61A, 61F comprising the measured received total wideband power (RTWP) for the first receiver branch 61A and the RTWP for the second receiver branch 61F. The estimation the extended Kalman filter in block 51 is thus based on inputs for both receiver branches. The Kalman filter provides outputs comprising two sets of power estimates 62A, 63A, 62C, 63C and corresponding standard deviations 62B, 63B, 62D, 63D. The output 62A is as above an estimate of a power quantity associated with the first receiver branch. The output 62C is an estimate of a power quantity associated with the second receiver branch. The output 63A is as above the estimated received total wideband power (RTWP) of the first receiver branch and the output 63C is the estimated received total wideband power (RTWP) of the second receiver branch. The power estimate 62A and the standard deviation 62B are provided to a second block 52A associated with the first receiver branch. The power estimate 62C and the standard deviation 62D are provided to a second block 52B associated with the second receiver branch. Each of the second blocks 52A and 52B performs the functionalities as described in connection with FIG. 4.

In the same way, each of the second blocks 52A and 52B output a respective extreme value 64A, 64B of the power quantities associated with the power estimates 62A and 62C, respectively, i.e. an approximate value of the noise floor. In this embodiment, these extreme values 64A, 64B are provided to a respective third block 53A and 53B. The third blocks 53A and 53B also receive the respective RTWP estimate 63A and 63C and the associated standard deviations 63B and 63D. The third blocks 53A and 53B uses these inputs for providing a respective noise rise measure 65A and 65B. However, the operation of the third blocks 53A and 53B are outside the main scope of the present invention.

It can be noticed, that the blocks 52A, B operate separately, i.e. each of them operates in the same manner as in the arrangement of FIG. 4. However, the first block 51 is a common block, where, in the present embodiment, the extended Kalman filter encompasses all input measurements and is designed to model also the remaining correlations between the different receiver branches.

In FIG. 7, only RTWP measurements are indicated as inputs to the first block 51. However, other power-related measurements and information can also be utilized in order to achieve a better estimation of a power quantity corresponding to a sum of neighbour cell WCDMA interference power, in-band non-WCDMA interference power and thermal noise floor power. This in turn improves the noise floor estimation. It is thus possible to use e.g. inputs as in FIG. 4, but for both receiver branches. Another alternative is to use additional measures of received scheduled enhanced uplink power, RSEPS, as input to the estimator. The estimated power quantity provided to the second blocks 52A and 52B could then preferably be related to the difference between the RTWP and the RSEPS for each receiver branch. Variants of handling the nonlinear measurement then preferably have to be specified. The modelling of power dynamics is also preferably enhanced, to general dynamics as compared to the random walk modelling previously exploited. Adaptive spectral estimation is included in the front end, for estimation of such general dynamics.

In an alternative embodiment, a common RSEPS value for all receiver branches can be used. Such a common RSEPS value can be constituted e.g. by the RSEPS of one of the branches, an average value for all branches or dependent on at least one branch RSEPS value according to some other relation. The common RSEPS value can then be utilized for estimating the power quantities for the different receiver branches.

An embodiment of a general state space modelling is now described. A joint block state space model is created. The generic state space model that is used to describe the powers of the cell used in the noise rise estimator is:

$$x(t+T)=a(x(t))+w(t)$$

$$y(t)=c(x(t))+e(t) \quad (3)$$

Here $x(t)$ is a state vector consisting of various powers of relevance to a specific cell. In particular, $x(t)$ contains one block of power states for each receiver branch. $y(t)$ is an output vector consisting of the power measurements performed in the cell (e.g. the total received wideband power, RTWP). Also $y(t)$ contains one measurement block for each receiver branch. $w(t)$ is the so called systems noise that represents the model error, and $e(t)$ denotes the measurement error. Both these quantities contain one block for each receiver branch. $a(x(t))$ describes the, possibly nonlinear, dynamic modes, while the vector $c(x(t))$ is the, possibly nonlinear, measurement vector, which is a function of the states of the system. Finally $t$ represents the time and $T$ represents the sampling period. In the following, specializations will be introduced to quantify the detailed aspects of embodiments of the current invention.

States and receiver branch blocks are to be defined. The selected state variables are defined to correspond to cell power quantities. A detailed embodiment where both RTWP and RSEPS measurements are available is described in Appendix A. Correlation properties between receiver branches, e.g. regarding spatial and polarization correlation effects have to be included. The estimation algorithm comprises preferably a joint system noise covariance modelling correlation between the different receiver branches. The joint system noise covariance comprises more preferably at least one of spatial diversity covariance and polarization diversity covariance. This is also exemplified in Appendix A.

The next step is to discuss the second equation of (3), i.e. the available measurement alternatives. The selected measurement functions correspond at least to the quantities representing the measured received total wideband power of the first and second receiver branches. Different measurement alternatives, based on both RTWP and RSEPS measurements are possible, of which one is discussed more in detail in Appendix B.

As mentioned further above, the method could also be based on power measurements in a more general sense. For load estimation purposes, the code powers of each channel of the own cell can be exploited, at the price of a Kalman filter with a very high order. The treatment of WO 2007/024166 and complexity reductions of WO2007/055626 can be generalized along the lines of the present invention disclosure as briefly described here below.

The RSEPS state block, of each receiver branch, are replaced with code power blocks, one block for each channel of the cell. Each code power state block has its own individual modelling of dynamics and systems noise covariance. The RSEPS measurement equations, of each receiver branch, are replaced with one code power measurement for each channel of the own cell. The modelling alternative in Appendix B may need additions to cover e.g. SIR measurement definitions from which code powers can be derived. The details are omitted.

The treatment in Appendix A and B was based on the choice of the RSEPS and residual powers as the "main" states. However, the state selection is in fact arbitrary—the only thing that matters is that the dynamics and the measurement equations of (3) are consistently defined. This is further discussed in Appendix C.

All quantities have now been defined and the extended Kalman filter can be applied with any combination of state model and measurement model according to the appendices A, B and C. The general extended Kalman filter is presented in Appendix D.

An arrangement for supervision of faults in a receiving signal chain of a wireless communication comprises mainly two parts. A first part is involved in providing useful data, i.e. a means for providing data representing measured received power in a receiving signal chain at a number of time instances. A second part is involved in processing this data in order to achieve information about any occurrence of a fault. This second part is typically performed by a processor arrangement. Such a processor arrangement is in one embodiment a single processor in a single node of the communication system. However, in another embodiment, the processor arrangement is a distributed arrangement comprising parts of more than one processor. The different processors may even be physically situated at different sites in the communication system or any network connected thereto.

Figure 8:
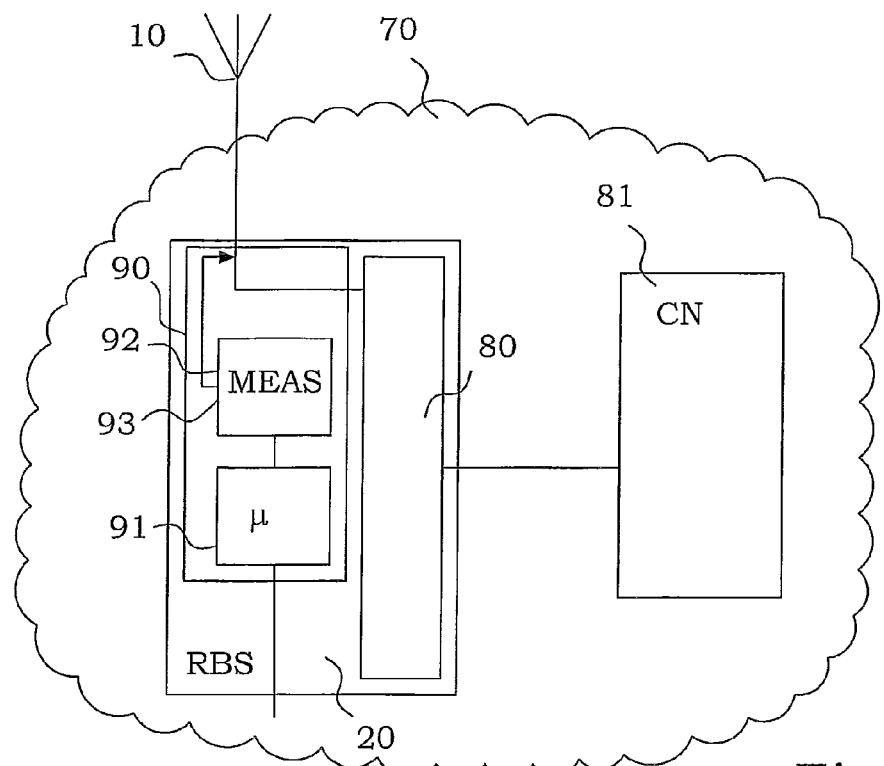
FIG. 8 is a block diagram of an embodiment of a cellular communication system according to the present invention.

FIG. 8 illustrates a schematic block diagram of one embodiment of a wireless communication system 70 comprising an arrangement 90 for supervision of faults in a receiving signal chain. In this embodiment, the arrangement 90 for supervision of faults in a receiving signal chain is comprised in a node for use in the wireless communication system 70, in this embodiment a radio base station (RBS) 20. The RBS 20 comprises means 80 for ordinary operation of the RBS 20, and is connected to at least one antenna 10 and is further connected to a core network 81 of the wireless communication system 70.

The arrangement 90 for supervision of faults in a receiving signal chain comprises means 92 for providing data representing measured received power in a receiving signal chain at a number of time instances. In the present embodiment, the means 92 for providing data comprises measuring means 93 arranged for measuring received power in a receiving signal chain at a number of time instances. The arrangement 90 for supervision of faults further comprises a processor arrangement 91. The processor arrangement 91 is connected to the means 92 for providing data and is arranged for operating a fault supervision based on the data provided from the means 92 for providing data.

Figure 9:
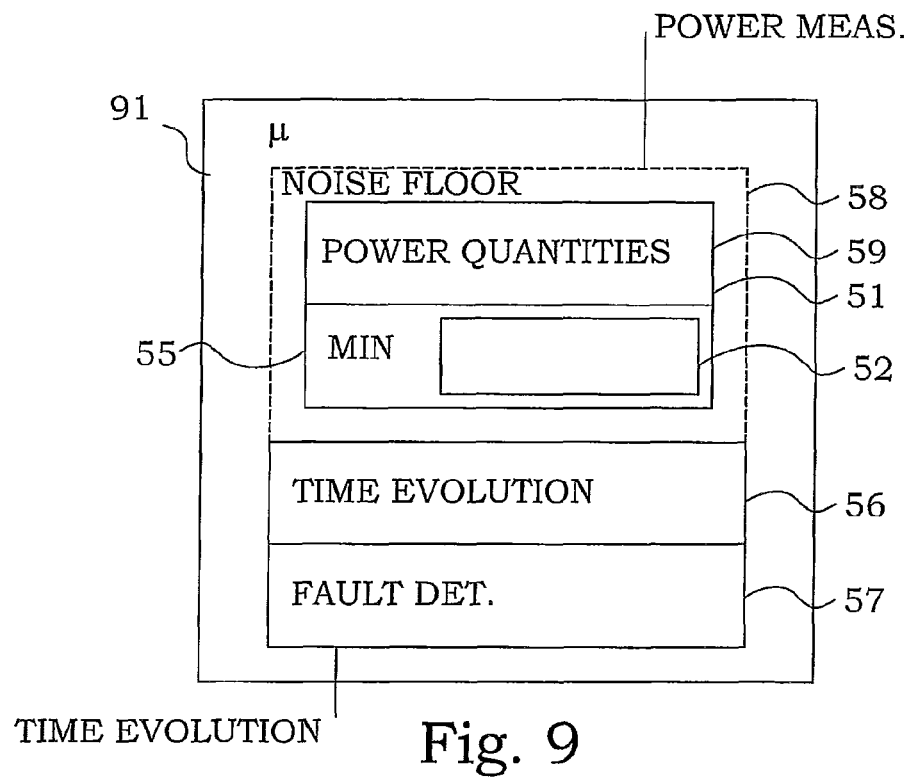
FIG. 9 is a block diagram of an embodiment of a processor arrangement according to the present invention.

One embodiment of a processor arrangement 91, useable in e.g. the arrangement of FIG. 8, is illustrated in FIG. 9. In this embodiment, the processor arrangement 91 comprises a section 58 arranged for determining a noise floor value at a number of time instances based on data provided from a means for providing data representing measured received power in a receiving signal chain at a number of time instances (c.f. FIG. 8). In the present embodiment, the section 58 comprises a block 59 arranged for obtaining power related quantities at a number of time instances based on said provided data. In the present embodiment, this block is arranged in accordance with the first block 51 described in connection with FIG. 4. If receiver diversity is utilised, the block 59 is instead preferably arranged according to the first block 51 described in connection with FIG. 7. The obtained power related quantities are provided to a noise floor block 55, in which the noise floor value is determined based on the obtained power related quantities. In the present embodiment, this is mainly performed by a second block 52 in accordance with FIG. 4 or FIG. 7. For the details of the operations of the blocks 51 and 52, references are made to the discussions in connection with FIGS. 4 and 7.

The processor arrangement 91 further comprises a section 56, connected to the section 58, for evaluating a time evolution of the determined noise floor values. The processor arrangement also comprises a section 57, connected to the section 56, for detecting any occurrence of a fault in the receiving signal chain based on the time evolution. Preferably such detecting is performed by comparing the time evolution with a model evolution and indicating a fault if a measure representing a difference between the time evolution and the model evolution exceeds a threshold value. The model evolution is in this particular embodiment based on a statistical treatment of previous time evolutions for corresponding conditions. The section 56 for evaluating a time evolution outputs a signal representing a detected fault or a situation of no fault. This output can be utilized by other parts of the system and/or external parts for performing suitable actions, e.g. reporting of any fault to an operator.

In a further embodiment, the measuring means 93 is arranged for measuring received power at least two positions in a receiving signal chain at a number of time instances. The section 58 is accordingly arranged for determining a separate noise floor value for each position. The section 57, for detecting any occurrence of a fault then bases the detection on a comparison between the time evolution of the determined noise floor values of the at least two positions.

Figure 10:
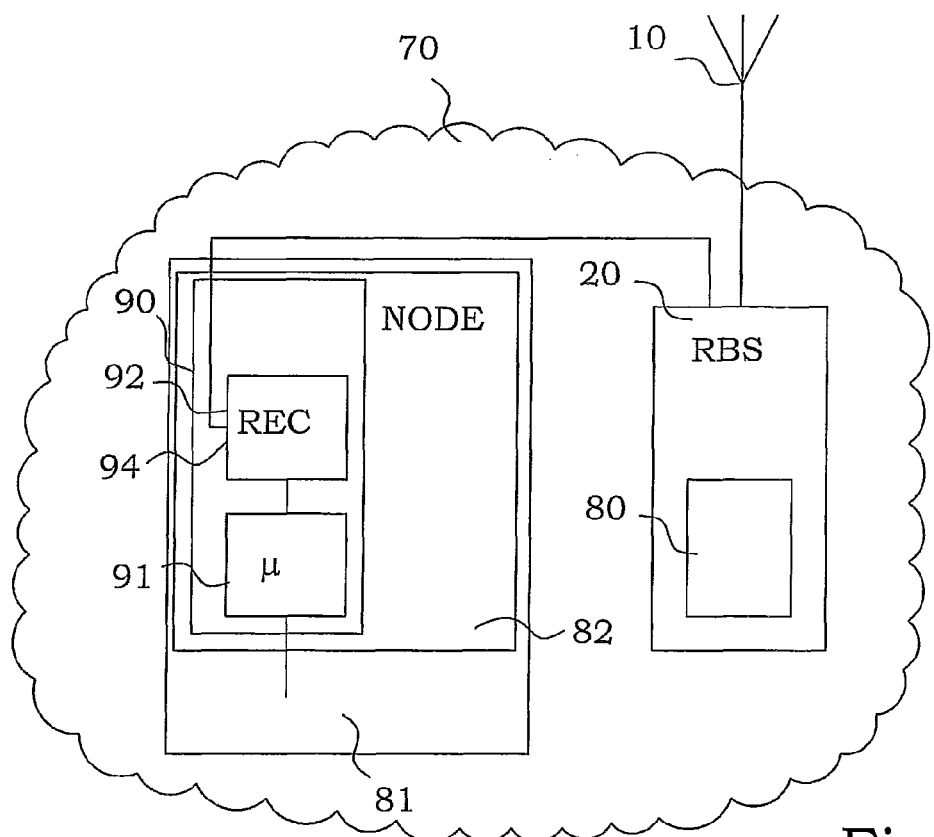
FIG. 10 is a block diagram of another embodiment of a cellular communication system according to the present invention.

FIG. 10 illustrates a schematic block diagram of another embodiment of a wireless communication system 70 comprising an arrangement 90 for supervision of faults in a receiving signal chain. In this embodiment, the arrangement 90 for supervision of faults is comprised in a node 82 of the core network 81 of the wireless communication system 70. In the present embodiment, the means 92 for providing data comprises a data receiver 94 for quantities related to measured received power in the receiving signal chain at a number of time instances. The data receiver 94 is preferably connected, directly or indirectly, to a base station 20, in which the actual measurements are performed. In this way, the fault supervision can be performed remotely, and preferably in a coordinated manner for a number of base stations.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Appendix A

If both RTWP and RSEPS measurements are available, in order to provide an estimate of the residual power in the digital receiver, i.e. the received total wideband power minus the received scheduled enhanced uplink power (shared), and to compute a noise floor measure, typically a two state model for each branch is introduced. The selection of states is, as usual, arbitrary. However, one natural choice is to use one state that describes the RSEPS and one state that describes "the rest" of the power, here denoted the residual power. In case the objective is limited solely to the estimation of a noise floor measure, it is possible to use a one state model.

Noting that these states describe powers and are therefore necessarily positive, they need to include a nonzero mean value. Such mean values are modelled as random walk components. It is assumed that any power measurements defined logarithmically using e.g., the dBm scale has been transformed to the linear power domain before processing. For the selection of states of the present example, this leads to the state definitions:

$$x_{RSEPSPower,i}(t+T) = \begin{pmatrix} x_{RSEPSPower,i}(t+T) \\ x_{RSEPSPowerDynamics,i}(t+T) \end{pmatrix} \quad (A1)$$

$$= \begin{pmatrix} 1 & A^1_{RSEPSPower,i}(t) \\ 0 & A^2_{RSEPSPower,i}(t) \end{pmatrix} \begin{pmatrix} x_{RSEPSPower,i}(t) \\ x_{RSEPSPowerDynamics,i} \end{pmatrix} +$$

$$\begin{pmatrix} w_{RSEPSPower,i}(t) \\ w_{RSEPSPowerDynamics,i}(t) \end{pmatrix}$$

$$= \begin{pmatrix} 1 & A^1_{RSEPSPower,i}(t) \\ 0 & A^2_{RSEPSPower,i}(t) \end{pmatrix} x_{RSEPSPower,i}(t) + w_{RSEPSP,i}(t),$$

$i = 1, \ldots, N_{Branches}.$ $$x_{Residual,i}(t+T) = \begin{pmatrix} x_{Residual,i}(t+T) \\ x_{ResidualDynamics,i}(t+T) \end{pmatrix} \quad (A2)$$

$$= \begin{pmatrix} 1 & A^1_{Residual,i}(t) \\ 0 & A^2_{Residual,i}(t) \end{pmatrix} \begin{pmatrix} x_{Residual,i}(t) \\ x_{ResidualDynamics,i}(t) \end{pmatrix} +$$

$$\begin{pmatrix} w_{Residual,i}(t) \\ w_{ResidualDynamics,i}(t) \end{pmatrix}$$

$$= \begin{pmatrix} 1 & A^1_{Residual,i}(t) \\ 0 & A^2_{Residual,i}(t) \end{pmatrix} x_{Residual,i}(i) + w_{Residual,i}(t),$$

$i = 1, \ldots, N_{Branches}.$ $$x(t) = \begin{pmatrix} x_{RSEPSPower,1}(t) \\ x_{Residual,1}(t) \\ \vdots \\ x_{RSEPSPower,N_{Branch}}(t) \\ x_{Residual,N_{Branch}}(t) \end{pmatrix} \quad (A3)$$

$$w(t) = \begin{pmatrix} w_{RSEPSPower,1}(t) \\ w_{Residual,1}(t) \\ \vdots \\ w_{RSEPSPower,N_{Branch}}(t) \\ w_{Residual,N_{Branch}}(t) \end{pmatrix}. \quad (A4)$$

Here (A3) refers to (3). $x_{RSEPSPower,i}(t)$ denotes the state corresponding to the received scheduled enhanced uplink power of receiver branch i, that is measured as the logarithmic fractional RSEPS quantity, $x_{RSEPSPowerDynamics,i}(t)$ denotes the power state variables that are used for modelling of the dynamics of the power that is expressed by the RSEPS quantity, for receiver branch i. This dynamics is described by the matrices $A_{RSEPSPower,i}^1(t)$ and $A_{RSEPSPower,i}^2(t)$ where the time variation is introduced mainly to allow for the introduction of time variable adaptive spectral analysis processing, as described below. The quantity $w_{RSEPSPower,i}(t)$ is the process noise (i.e. the stochastic modelling error) of the power of receiver branch i, corresponding to the fractional RSEPS quantity. The notation is the same for the quantities that describe the residual power.

At this point is stressed that the quantity that is to be fed into the subsequent noise power floor estimation steps (one for each receiver branch) is given by the estimated $x_{Residual,i}(t)$, $i=1, \ldots, N_{Branches}$, and the corresponding estimated variance (see below). The final result of this subsection is the state model $$x(t+T)=A(t)x(t)+w(t) \quad (A5)$$

where the system matrix A(t) is given by $$A(t) = \quad (A6)$$

$$\begin{pmatrix} 1 & A^1_{RSEPSPower,1}(t) & 0 & & \cdots & & & \cdots & & 0 \\ 0 & A^2_{RSEPSPower,1}(t) & 0 & & \cdots & & & & & \vdots \\ 0 & 0 & 1 & A^1_{Residual,1}(t) & 0 & & & & & \\ \vdots & & & 0 & A^2_{Residual,1}(t) & 0 & & & & \\ & & & & 0 & \ddots & & & & \\ & & & & & \ddots & 1 & A^1_{RSEPSPower,N_{Branch}}(t) & 0 & \vdots \\ & & & & & & 0 & A^2_{RSEPSPower,N_{Branch}}(t) & & 0 \\ \vdots & & & & & & & 0 & 1 & A^1_{RSEPSPower,N_{Branch}}(t) \\ 0 & \cdots & & & \cdots & & & 0 & 0 & A^2_{RSEPSPower,N_{Branch}}(t) \end{pmatrix}.$$

Note that (A6) is a special case of the first equation of (3), since a(x(t))=A(t)x(t).

It remains to define the statistical properties of the process noise. These quantities are modelled as white Gaussian zero mean random processes. As compared to prior art, correlation is introduced between powers of one receiver branch, as well as between powers of different receiver branches using the system noise covariance matrix. This is a situation that can be expected when Rx diversity and some variants of MIMO receiving systems are designed.

As an example of a typical embodiment, each receiver branch is assumed to fulfil:

$$E[w_{RSEPSPower,i}(t)w_{RSEPSPower,i}^T(t)] = \begin{pmatrix} R_{1,RSEPSPower,i} & 0 \\ 0 & R_{1,RSEPSPower,i} \end{pmatrix}, \quad (A7)$$

$i = 1, \ldots, N_{Branches},$ $$E[w_{Residual,i}(t)w_{Residual,i}^T(t)] = \begin{pmatrix} R_{1,Residual,i} & 0 \\ 0 & R_{1,ResidualDynamics,i} \end{pmatrix}, \quad (A8)$$

$i = 1, \ldots, N_{Branches},$ $$E[w_{RSEPSPower,i}(t)w_{Residual,i}^T(t)] = \begin{pmatrix} R_{1,RSEPSResidual,i} & 0 \\ 0 & 0 \end{pmatrix}, \quad (A9)$$

$i = 1, \ldots, N_{Branches}.$

Here E[.] denotes statistical expectation. Note that the special case without power dynamics is readily obtained by deletion of the corresponding states and matrix blocks.

To summarize, the following describes the systems noise covariance, for receiver branch i $$R_{1,i} = \begin{pmatrix} R_{1,RSEPSPower,i} & 0 & R_{1,RSEPSResidual,i} & 0 \\ 0 & R_{1,RSEPSPowerDynamics,i} & 0 & 0 \\ R_{1,RSEPSResidual,i} & 0 & R_{1,Residual,i} & 0 \\ 0 & 0 & 0 & R_{1,ResidualDynamics,i} \end{pmatrix}.$$

In the above embodiment correlation is introduced between the states corresponding to the residual power and the RSEPS power, whereas the correlation between power and dynamics is left unaffected, as is the correlation between the dynamics of the residual power and the RSEPS power. More general setups are of course possible, where all correlation elements are left in the matrices. The problem is then the determination of a large number of unknown correlation parameters. In view of this, the above assumption seems reasonable, since it captures at least the correlation between powers within a matrix block.

It remains to model the correlations, between the powers of different receiver branches. Correlation properties between receiver branches, e.g. regarding spatial and polarization correlation effects have to be included. The estimation algorithm comprises preferably a joint system noise covariance modelling correlation between the different receiver branches. The joint system noise covariance comprises more preferably at least one of spatial diversity covariance and polarization diversity covariance. Considering a typical embodiment with an antenna array with receiver branches uniformly distributed, with corresponding receiver signal chains, it is reasonable to assume that the correlations between an arbitrary stationary received power signal.

$$x^{received}(t) = \begin{pmatrix} x_1(t) \\ x_2(t) \\ \vdots \\ x_{N_{Branch}-1}(t) \\ x_{N_{Branch}}(t) \end{pmatrix} \quad (A11)$$

in the antenna array with multiple Rx diversity receiving branches is given by $$\rho^{received} = (D^{recieved})^{-1} E\begin{bmatrix} (x^{received}(t) - x_{true}^{received}(t)) \\ (x^{received}(t) - x_{True}^{received}(t))^T \end{bmatrix} (D^{recieved})^{-1} \quad (A12)$$

$$= \begin{pmatrix} 1 & \rho & \cdots & \rho^{|N_{Branch}-2|} & \rho^{|N_{Branch}-1|} \\ \rho & 1 & \ddots & & \rho^{|N_{Branch}-2|} \\ \vdots & \ddots & \ddots & \ddots & \vdots \\ \rho^{|2-N_{Branch}|} & & \ddots & 1 & \rho \\ \rho^{|1-N_{Branch}|} & \rho^{|2-N_{Branch}|} & & \rho & 1 \end{pmatrix}.$$

Here $\rho$ denotes the correlation between systems power noise between adjacent receiver branches. $x_{True}^{Received}(t)$ denotes the "true" (conditional mean) received signal. The standard deviation matrix $D^{received}$ is given by $$D^{recieved} = \quad (A13)$$

$$\begin{pmatrix} \sqrt{E\left[\begin{array}{c} x_1^{received}(t) - \\ x_{1,true}^{received}(t) \end{array}\right]^2} & 0 & \cdots & \cdots & 0 \\ 0 & \ddots & & & \vdots \\ \vdots & & \ddots & & \vdots \\ \vdots & & & \ddots & 0 \\ 0 & \cdots & \cdots & 0 & \sqrt{E\left[\begin{array}{c} x_{N_{Branch}}^{received}(t) - \\ x_{N_{Branch},true}^{received}(t) \end{array}\right]^2} \end{pmatrix}$$

It should be noted that more general assumptions are possible. However, the model (A12) is commonly employed in the state of the art, when spatial diversity is discussed.

When polarization diversity is at hand, different models apply. It may then be assumed that the correlation between adjacent antenna elements with different orthogonal polarization is small, whereas the correlation follows (A12) for antenna elements with the same polarization. Non-orthogonal polarization may of course be applied in case the number of antenna elements exceeds 2. As an example, assuming orthogonal polarization diversity with a remaining polarization error correlation of η of every second antenna element, gives $$R^{received} = E\begin{bmatrix} (x^{received}(t) - x_{true}^{received}(t)) \\ (x^{received}(t) - x_{True}^{received}(t))^T \end{bmatrix} \qquad (A14)$$

$$= D^{received} \begin{pmatrix} 1 & \eta\rho & \cdots & \rho^{|N_{Branch}-2|} & \eta\rho^{|N_{Branch}-1|} \\ \eta\rho & 1 & \ddots & & \rho^{|N_{Branch}-2|} \\ \vdots & \ddots & \ddots & \ddots & \vdots \\ \rho^{|2-N_{Branch}|} & & \ddots & 1 & \eta\rho \\ \eta\rho^{|1-N_{Branch}|} & \rho^{|2-N_{Branch}|} & & \eta\rho & 1 \end{pmatrix} D^{received},$$

provided that $N_{Branch}$ is even. A similar expression holds in the odd case.

The combination of the correlation between receiver branches and the systems noise covariance matrix of a single receiver branch is the case. When combining, it is clear that each of the elements of (A12), (A14) (and other variants of the correlation matrix) affects all the corresponding states of the receiver branch. This means that the following block matrix formulation can be obtained from (A4), (A7)-(A10) and e.g. (A14)

$$R_1(t) = E[(w(t)w^T(t))] \qquad (A15)$$

$$= E\left[\begin{pmatrix} w_1(t) \\ \vdots \\ w_{N_{Branch}}(t) \end{pmatrix} (w_1^T(t) \ \cdots \ w_{N_{Branch}}^T(t))\right]$$

$$= \begin{pmatrix} R_{1,1}^{\frac{1}{2}} & 0 & \cdots & \cdots & 0 \\ 0 & R_{1,2}^{\frac{1}{2}} & & & \vdots \\ \vdots & & \ddots & & \vdots \\ \vdots & & & R_{1,N_{Branch}}^{\frac{1}{2}} & 0 \\ 0 & \cdots & \cdots & 0 & R_{1,N_{Branch}}^{\frac{1}{2}} \end{pmatrix}$$

$$\begin{pmatrix} I & I\eta\rho & \cdots & I\rho^{|N_{Branch}-2|} & I\eta\rho^{|N_{Branch}-1|} \\ I\eta\rho & I & \ddots & & I\rho^{|N_{Branch}-2|} \\ \vdots & \ddots & \ddots & \ddots & \vdots \\ I\rho^{|2-N_{Branch}|} & & \ddots & I & I\eta\rho \\ I\rho^{|1-N_{Branch}|} & I\rho^{|2-N_{Branch}|} & & I\eta\rho & I \end{pmatrix}.$$

$$\begin{pmatrix} R_{1,1}^{\frac{1}{2}} & 0 & \cdots & \cdots & 0 \\ 0 & R_{1,2}^{\frac{1}{2}} & & & \vdots \\ \vdots & & \ddots & & \vdots \\ \vdots & & & R_{1,N_{Branch}-1}^{\frac{1}{2}} & 0 \\ 0 & \cdots & \cdots & 0 & R_{1,N_{Branch}}^{\frac{1}{2}} \end{pmatrix}$$

This completes the discussion of the first equation of (3), applied for MIMO/Rx diversity load estimation and or calibration.

Note that there are many variations on the above theme— the details depend on the antenna geometry and the transmission technology (e.g. polarization diversity).

Appendix B

The measurement of powers and modelling of measurement covariances here below are described for a single receiver branch. The reason is not to obscure the treatment with unnecessary detail when the measurement alternatives are discussed. The situation for multiple branches is discussed further below, where corresponding measurement alternatives are available.

An embodiment using both RTWP and RSEPS measurements of a number of receiver branches is used as a model embodiment. Received total wideband power (RTWP(t)) and the received scheduled enhanced uplink power (RSEPS(t)) are assumed to be defined according to the 3GPP release 7 definitions. On top of this, proprietary measurements may be performed, immediately after of even before analogue to digital conversion.

Noting that the RSEPS measurement is typically expressed as a fraction of the RTWP measurement that is defined for joint measurement (defined on exactly the same time interval), it is clear that the measurement equation becomes non-linear. For each branch i:

$$RSEPS_i^{measurement}(t) = q_{RSEPS}\left(10\log^{10}\left(\frac{x_{RSEPSPower,i}(t) + e_{RSEPSPower,i}(t)}{RTWP_i^{measurement}(t)}\right)\right). \quad (B1)$$

Here $x_{RSEPSPower,i}(t)$ denotes the true power of the RSEPS quantity of branch i, $e_{RSEPSPower,i}(t)$ denotes the corresponding measurement uncertainty and $q_{RSEPS}(.)$ is the quantization function of the RSEPS measurement. The RTWP measurement is similarly defined, $$RTWP_i^{measuremnet}(t) = q_{RTWP}(10\log^{10}(x_{Residual,i}(t) + x_{RSEPSPower,i}(t) + e_{RTWP,i}(t)) + 30). \quad (B2)$$

Where the RTWP is measured in dBm and where all power state variables are in Watts. The notation parallels that of the RSEPS measurement. The measurement disturbances are assumed to be zero mean, Gaussian and white, with $$E[e_{RSEPSPower,i}(t)]^2 = R_{2,RSEPSPower,i} \quad (B3)$$

$$E[e_{RTWP,i}(t)]^2 = R_{2,RTWP,i} \quad (B4)$$

The quantization is normally fine enough to be neglected. Here it is assumed that the quantization is neglected.

In the present embodiment, logarithmic relative measurements of RSEPS are assumed. The original definition of (B1) is retained, with the quantization effects neglected. This gives, after a Taylor series expansion $$RSEPS_i^{log\ measurement}(t) \approx \quad (B5)$$

$$10\log^{10}\left(\frac{x_{RSEPSPower,i}(t)}{x_{Residual,i}(t) + x_{RSEPSPower,i}(t)}\right) + e_{log\ RSEPCompensated,i}(t),$$

where $$E[e_{log\ RSEPSCompensated,i}(t)]^2 \approx \quad (B6)$$

$$\left(\frac{10}{\log(10)}\right)^2 \left(\left(\frac{1}{RTWP_i^{powermeasurement}(t)}\right)^2 R_{2,RTWP,n} + \left(\frac{1}{RSEPS_i^{powermeasurement}(t)}\right)^2 R_{2,RSEPSPower,i}\right).$$

Here $RTWP_i^{powermeasurement}(t)$ and $RSEPS_i^{powermeasurement}(t)$ are the artificial power measurements in watts, that result when (B2) and (B5) are solved for the state variables. A similar treatment of (B2) results in $$RTWP_i^{logmeasurement}(t) \approx 10\log^{10}(x_{RSEPSPower,i}(t) + x_{Residual,i}(t)) + 30 + e_{logRTWPcompensated,i}(t), \quad (B7)$$

where $$E[e_{log\ RTWPCompensated,i}(t)]^2 \approx \quad (B8)$$

$$\left(\frac{10}{\log(10)}\right)^2 \left(\left(\frac{1}{RTWP_i^{powermeasurement}(t)}\right)^2 R_{2,RTWP,i}\right).$$

Furthermore, the cross coupling becomes $$E[e_{log\ RTWPCompensated,i}(t)e_{log\ RSEPSCompensated,i}(t)] \approx \quad (B9)$$

$$-\left(\frac{10}{\log(10)}\right)^2 \left(\left(\frac{1}{RTWP_i^{powermeasurement}(t)}\right)^2 R_{2,RTWP,i}\right).$$

The nonlinear measurement model with reference to (3) is given by:

$$y(t) = \begin{pmatrix} RSEPS_1^{log\ measurement}(t) \\ RTWP_1^{log\ measurement}(t) \\ \vdots \\ RSEPS_{N_{Branch}}^{log\ measurement}(t) \\ RTWP_{bRANCH}^{log\ measurement}(t) \end{pmatrix} \quad (B10)$$

$$c(x(t)) = \begin{pmatrix} 10\log^{10}\left(\frac{x_{RSEPSPower,1}(t)}{x_{RSEPSPower,1}(t) + x_{Residual,1}(t)}\right) \\ 10\log^{10}(x_{RSEPSPower,1}(t) + x_{Residual,1}(t)) + 30 \\ \vdots \\ 10\log^{10}\left(\frac{x_{RSEPSPower,N_{Branch}}(t)}{x_{RSEPSPower,N_{Branch}}(t) + x_{Residual,N_{Branch}}(t)}\right) \\ 10\log^{10}(x_{RSEPSPower,N_{Branch}}(t) + x_{Residual,N_{Branch}}(t)) + 30 \end{pmatrix} \quad (B11)$$

$$e(t) = \begin{pmatrix} e_{log\ RSEPSCompensated,1}(t) \\ e_{log\ RTWPCompensated,1}(t) \\ \vdots \\ e_{log\ RSEPSCompensated,N_{Branch}}(t) \\ e_{log\ RTWPCompensated,N_{Branch}}(t) \end{pmatrix} \quad (B12)$$

$$R_{2,i}(t) = \left(\frac{10}{\log(10)}\right)^2 \cdot \quad (B13)$$

$$\left(\left(\frac{1}{RSEPS_i^{powermeasurement}}\right) \quad \left(\frac{-1}{RTWP_i^{powermeasurement}(t)}\right)\right) \cdot$$
$$\left(0 \quad \left(\frac{1}{RTWP_i^{powermeasurement}(t)}\right)\right)$$

$$\begin{pmatrix} R_{2,RSEPSPower} & 0 \\ 0 & R_{2,RTWP} \end{pmatrix}.$$

$$\left(\left(\frac{1}{RSEPS_i^{powermeasurement}}\right) \quad 0\right)$$
$$\left(\left(\frac{1}{RTWP_i^{powermeasurement}(t)}\right) \quad \left(\frac{1}{RTWP_i^{powermeasurement}(t)}\right)\right),$$

$i = 1, \ldots N_{Branch}$ $$R_2(t) = \begin{pmatrix} R_{2,1}(t) & & 0 \\ & \ddots & \\ 0 & & R_{2,N_{Branch}}(t) \end{pmatrix}. \quad (B14)$$

The use of logarithmic relative measurements of the RTWP and the RSEPS in the present embodiment is only one of many different alternatives. Many other options, e.g. using only RTWP measurements, separate or logarithmic relative measurements, are possible. Also other alternative relations between the RSEPS and RTWP measurements are possible, e.g. separated linear measurements or relative linear measurements. The equations above have then to be adjusted correspondingly.

Appendix C

To describe the procedure of defining dynamics and measurement equations, assume for simplicity that no dynamics is included in the state model. Define new states by:

$$\begin{pmatrix} x_1(t) \\ x_2(t) \end{pmatrix} = \begin{pmatrix} t_{11} & t_{12} \\ t_{21} & t_{23} \end{pmatrix} \begin{pmatrix} x_{RSEPSPower}(t) \\ x_{Residual}(t) \end{pmatrix}. \quad (C1)$$

Here $$T = \begin{pmatrix} t_{11} & t_{12} \\ t_{21} & t_{23} \end{pmatrix} \quad (C2)$$

is a non-singular transformation matrix. Note that when such a matrix has been defined, the states $$\begin{pmatrix} x_1(t) \\ x_2(t) \end{pmatrix} \quad (C3)$$

are used in the state model of the Kalman filter. New measurement equations are formed, corresponding to the alternatives discussed above, by inserting the relation $$\begin{pmatrix} x_{RSEPSPower}(t) \\ x_{Residual}(t) \end{pmatrix} = \begin{pmatrix} t_{11} & t_{12} \\ t_{21} & t_{23} \end{pmatrix}^{-1} \begin{pmatrix} x_1(t) \\ x_2(t) \end{pmatrix} \quad (C4)$$

In the measurement equations. The same procedure as outlined above, using Taylor series expansions, is then followed to arrive at the remaining quantities required for processing with the extended Kalman filter. The following are important special cases $$\begin{pmatrix} x_{RSEPSPower}(t) \\ x_{RTWP}(t) \end{pmatrix} = \begin{pmatrix} 1 & 0 \\ 1 & 1 \end{pmatrix} \begin{pmatrix} x_{RSEPSPower}(t) \\ x_{Residual}(t) \end{pmatrix}. \quad (C5)$$

$$\begin{pmatrix} x_{Residual}(t) \\ x_{RTWP}(t) \end{pmatrix} = \begin{pmatrix} 0 & 1 \\ 1 & 1 \end{pmatrix} \begin{pmatrix} x_{RSEPSPower}(t) \\ x_{Residual}(t) \end{pmatrix}. \quad (C6)$$

Appendix D

The general extended Kalman filter is given by the following matrix and vector iterations, $$C(t) = \frac{\partial c(x)}{\partial x}\bigg|_{x=\hat{x}(t|t-T)} \quad (D1)$$

$$K_f(t) = P(t|t-T)C^T(t)(C(t)P(t|t-T)C^T(t) + R_2(t))^{-1}$$

$$\hat{x}(t|t) = \hat{x}(t|t-T) + K_f(t)(y(t) - C(t)\hat{x}(t|t-T))$$

$$P(t|t) = P(t|t-T) - K_f(t)C(t)P(t|t-T)$$

$$A(t) = \frac{\partial a(x)}{\partial x}\bigg|_{x=\hat{x}(t|t)}$$

$$\hat{x}(t+T|t) = Ax(t|t) + Bu(t)$$

$$P(t+T|t) = AP(t|t)A^T + R_1(t).$$

The quantities introduced by the filter iterations (D1) are as follows. $\hat{x}(t|t-T)$ denotes the state prediction, based on data up to time $t-T$, $\hat{x}(t|t)$ denotes the filter update, based on data up to time t, $P(t|-T)$ denotes the covariance matrix of the state prediction, based on data up to time $t-T$, and $P(t|t)$ denotes the covariance matrix of the filter update, based on data up to time t. C(t) denotes the linearized measurement matrix (linearization around most current state prediction), $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$ The filter is initialized by providing initial values to $\hat{x}(t|t-)$ and $P(t|t-T)$. Note that the total power pdf's of each receiver branch that is needed by the final RoT estimation step of load estimation algorithms, are obtained from the expected value of the output corresponding to the RTWP measurement as well as the expected covariance of the output corresponding to the RTWP measurement. This follows since approximate Gaussianity can be assumed. With the state selection as above with states for the residual power and the RSEPS power it immediately follows that $$x_{RTWP,i}(t) = x_{RSEPSPower,i}(t) + x_{Residual,i}(t) \quad (D2)$$

From which it follows that $$\hat{x}_{RTWP,i}(t|t) = \hat{x}_{RSEPSPower,i}(t|t) + \hat{x}_{Residual,i}(t|t) \quad (D3)$$

$$\hat{P}_{RTWP,i}(t|t) = \hat{P}_{RSEPSPower,i}(t|t) + \\ \hat{P}_{RSEPSPower,Residual,i}(t|t) + \\ \hat{P}_{Residual,RSEPSPower,i}(t|t) + \hat{P}_{Residual,i}(t|t). \quad (D4)$$

What is claimed is:

1. A method for supervision of faults in a receiving signal chain of a wireless communication system, comprising:
    providing data representing measured received powers at two or more positions in said receiving signal chain at a number of time instances;
    determining separate noise floor values for said at least two positions at a number of time instances based on said provided data;
    registering a time evolution of said determine noise floor values; and
    detecting any occurrence of a fault in said receiving signal chain based on a comparison between said registered time evolution of said determined noise floor values corresponding to at least two positions.

2. Method according to claim 1, wherein determining a noise floor value further comprises obtaining power related quantities at a number of time instances based on said provided data, and determining a noise floor value is based on said obtained power related quantities.

3. Method according to claim 1, wherein detecting any occurrence of a fault in said receiving signal chain comprises comparing said registered time evolution with a model time evolution and indicating a fault if a measure representing a difference between said registered time evolution and said model time evolution exceeds a threshold value.

4. Method according to claim 3, wherein said model time evolution is based on a statistical treatment of previous registered time evolutions for similar conditions.

5. Method according to claim 1, wherein providing data representing measured received powers in said receiving signal chain comprises receiving data representing measured received power in said receiving signal chain at a number of time instances.

6. Method according to claim 1, wherein providing data representing measured received powers in said receiving signal chain comprises measuring received power in said receiving signal chain at a number of time instances.

7. Method according to claim 1, wherein said power related quantities are obtained based on data representing at least two different types of received powers.

8. Method according to claim 7, wherein one type of received powers is received total wideband power.

9. Method according to claim 7, wherein determining a noise floor value comprises determining of a minimum value of said power related quantities within a time period.

10. Method according to claim 1, wherein determining a noise floor value comprises:
estimating of probability distributions for a power quantity based on said provided received powers, and
computing a conditional probability distribution of a noise floor measure based on at least a number of said estimated probability distributions for said power quantity.

11. Method according to claim 1, wherein:
said wireless communication system is provided with receiver diversity and said receiving signal chain comprises at least two receiver branches;
determining a noise floor value comprises determining of separate noise floor values for said at least two receiver branches; and
detecting any occurrence of a fault in said receiving signal chain is based on a comparison between said time evolutions of said determined noise floor values of said at least two receiver branches.

12. Method according to claim 11, wherein
providing data representing measured received powers comprises providing measurements of received total wideband power for at least a first receiver branch and a second receiver branch at a plurality of times;
determining a noise floor value comprises:
estimating, a plurality of times, a probability distribution for a first power quantity and a second power quantity, both being related to selected state variables of an estimation algorithm, based on said measurements of received total wideband power using selected measurement functions of said selected state variables of said estimation algorithm;
said selected state variables corresponding to cell power quantities; and
said selected measurement functions corresponding to said quantities representing said measured received total wideband power of said first and second receiver branches;
determining a noise floor value further comprises:
computing a conditional probability distribution of a first noise floor measure based on at least a number of said estimated probability distributions for said first power quantity, and a conditional probability distribution of a second noise floor measure based on at least a number of said estimated probability distributions for said second power quantity; and
providing said noise floor value based on said computed conditional probability distributions of said first and second noise floor measures.

13. A circuit for supervision of faults in a receiving signal chain of a wireless communication system, comprising a processor configured to:
determine separate noise floor values at two or more positions in said receiving signal chain at a number of time instances based on power measurement data representing measured received power in said receiving signal chain at a number of time instances;
evaluate a time evolution of said noise floor values; and
detect any occurrence of a fault in said receiving signal chain based on a comparison between said time evolution of said determined noise floor values at said two or more positions.

14. The circuit according to claim 13, wherein said processor is configured to obtain power related quantities based on said power measurement data, and wherein said noise floor value is based on said obtained power related quantities.

15. The circuit according to claim 13, wherein said processor is further configured to compare said time evolution with a model evolution and to indicate a fault if a measure representing a difference between said time evolution and said model evolution exceeds a threshold value.

16. The circuit according to claim 15, wherein said model evolution is based on a statistical treatment of previous time evolutions for corresponding conditions.

17. The circuit according to claim 13, further comprising a data receiver to receive said power measurement data.

18. The circuit according to claim 13, further comprising a power measurement circuit to measure received power in said receiving signal chain at a number of time instances and to generate said power measurement data.

19. The circuit according to claim 13, wherein said power related quantities are obtained based on power measurement data representing at least two different types of received powers.

20. The circuit according to claim 19, wherein one of said at least two different types of received powers is received total wideband power.

21. The circuit according to claim 19, wherein said processor is further configured to determine a minimum value of said power related quantities within a time period.

22. The circuit according to claim 13, wherein said processor arrangement is further configured to:
estimate probability distributions for a power quantity based on said measured received powers; and
compute a conditional probability distribution of a noise floor measure based on at least a number of said estimated probability distributions for said power quantity.

23. The circuit according to claim 13, wherein said wireless communication system is provided with receiver diversity and said receiving signal chain comprises at least two receiver branches and said obtained power related quantities are related to received powers at said at least two receiver branches; and wherein said processor is configured to:
determine separate noise floor values for said at least two receiver branches; and
detect any occurrence of a fault in said receiving signal chain based on a comparison between said time evolutions of said determined noise floor values of at least two receiver branches.

24. The circuit according to claim 23, wherein said power measurement data comprises measurements of received total wideband power for at least a first receiver branch and a second receiver branch at a plurality of times, and wherein said processor is further configured to:
estimate, at a plurality of times, a probability distribution for a first power quantity and a second power quantity, both being related to selected state variables of an estimation algorithm, from said received total wideband power measurements using selected measurement functions of said selected state variables of said estimation algorithm; said selected state variables corresponding to cell power quantities; said selected measurement functions corresponding to said quantities representing said measured received total wideband power of said first and second receiver branches;
determine a noise floor value at a number of time instances by:
computing a conditional probability distribution of a first noise floor measure based on at least a number of said estimated probability distributions for said first power quantity, and a conditional probability distribution of a second noise floor measure based on at least a number of said estimated probability distributions for said second power quantity; and providing said noise floor value based on said computed conditional probability distributions of said first and second noise floor measures.

25. A network node for use in a wireless communication system comprising a circuit according to claim 13.

26. A network node according to claim 25, wherein said network node is a base station.

27. A wireless communication system comprising at least one node according to claim 25.

28. The method of claim 1, wherein detecting any occurrence of a fault in the receiving signal chain based on the registered time evolution includes:

detecting the occurrence of the fault in a signal handling unit of the receiving signal chain responsive to the registered time evolution being at least a predetermined threshold.

29. The circuit of claim 13, wherein the processor is further configured to:

detect the occurrence of the fault in a signal handling unit of the receiving signal chain responsive to the registered time evolution being at least a predetermined threshold.

* * * * *